US006753519B2

(12) United States Patent
Gombert

(10) Patent No.: US 6,753,519 B2
(45) Date of Patent: Jun. 22, 2004

(54) ARRANGEMENT FOR THE DETECTION OF RELATIVE MOVEMENTS OR RELATIVE POSITIONS OF TWO OBJECTS

(75) Inventor: Bernd Gombert, Grafrath (DE)

(73) Assignee: 3DConnexion GmbH (DE)

(*) Notice: Subject to any disclaimer, the term of this patent is extended or adjusted under 35 U.S.C. 154(b) by 36 days.

(21) Appl. No.: 10/094,635

(22) Filed: Mar. 12, 2002

(65) Prior Publication Data

US 2003/0102426 A1 Jun. 5, 2003

(30) Foreign Application Priority Data

Nov. 30, 2001 (DE) ........................................ 101 58 777

(51) Int. Cl.[7] ............................ H01J 5/16; G01D 5/34; G01D 7/00; G01B 11/14

(52) U.S. Cl. .................... 250/221; 250/231.1; 356/621; 73/862.042

(58) Field of Search ......................... 250/231.1, 231.19, 250/229, 221, 222.1, 227.21, 227.22; 356/614, 615, 620, 621; 73/862.041, 862.042, 862.043, 862.824, 862.324

(56) References Cited

U.S. PATENT DOCUMENTS

| | | | | |
|---|---|---|---|---|
| 3,628,394 A | | 12/1971 | Keatinge et al. | |
| 3,921,445 A | | 11/1975 | Hill et al. | |
| 4,178,799 A | | 12/1979 | Schmieder et al. | |
| 4,409,736 A | | 10/1983 | Seltzer | 33/169 C |
| 4,589,810 A | | 5/1986 | Heindl et al. | |
| 4,748,323 A | * | 5/1988 | Holiday | |
| 4,763,531 A | | 8/1988 | Dietrich et al. | |
| 4,785,180 A | | 11/1988 | Dietrich et al. | |
| 5,117,102 A | * | 5/1992 | Mitchell | |
| 5,591,924 A | * | 1/1997 | Hilton | |
| 6,106,878 A | * | 8/2000 | Stimpfl | |

FOREIGN PATENT DOCUMENTS

| | | | |
|---|---|---|---|
| DE | 1773870 | 1/1972 | G01L/1/22 |
| DE | 2727704 | 1/1979 | |
| DE | 3240251 | 6/1984 | |
| DE | 3314089 C2 | 10/1984 | G01B/11/03 |
| DE | 3611336 | 10/1987 | |
| DE | 3611337 | 10/1987 | |
| DE | 29901998 U1 | 4/2000 | G06K/11/08 |
| EP | 0117334 A2 | 9/1984 | G01L/5/16 |

OTHER PUBLICATIONS

*Bibliography and Abstract of German Patent DE2727704*, esp@cenet.com, Jun., 2002 (1 pg.).
*Bibliography and Abstract of German Patent DE3240251*, esp@cenet.com, Jun., 2002 (1 pg.).
*Bibliography and Abstract of German Patent DE3611336*, esp@cenet.com, Jun., 2002 (1 pg.).
*Bibliography and Abstract of German Patent DE3611337*, esp@cenet.com, Jun., 2002 (1 pg.).

* cited by examiner

*Primary Examiner*—David Porta
*Assistant Examiner*—David C. Meyer
(74) *Attorney, Agent, or Firm*—Wood, Herron & Evans, LLP

(57) ABSTRACT

An optoelectronic arrangement for the detection of relative movements or relative positions of two objects, which comprises at least three light emitting means as optoelectronic elements, with the light emitting means being arranged on a closed, imaginary first surface which is plane or convex in each site in such a manner that their respective emission means face towards a first inner space which is defined by the first surface. Further, a force and/or moment sensor provided with this arrangement with a first board and a second board, with the first board and the second board being elastically connected with each other and movable relative to one another. Finally, a personal computer keyboard which is provided with such a force and/or moment sensor.

19 Claims, 2 Drawing Sheets

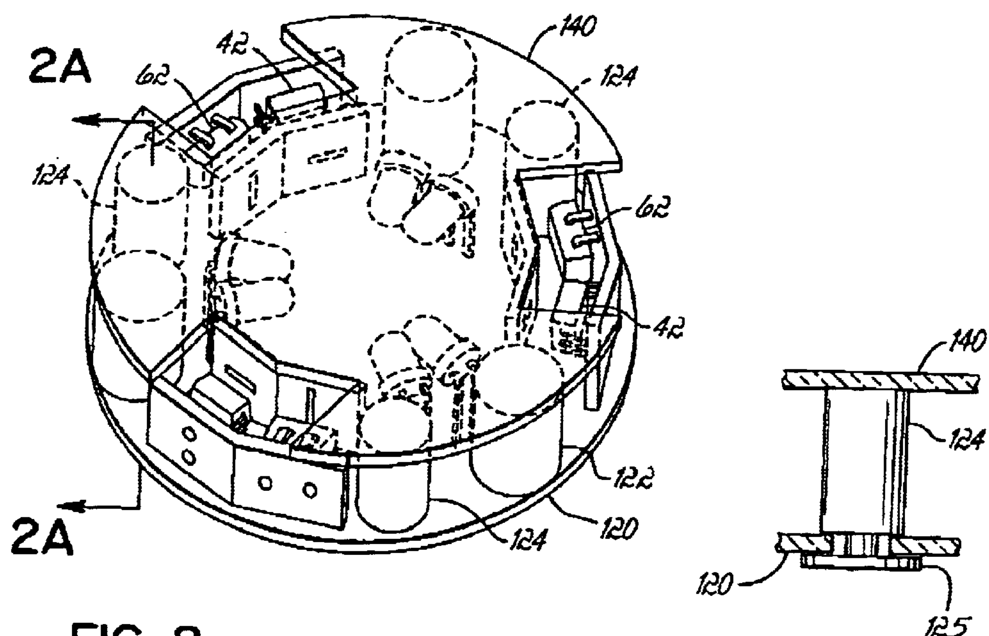
FIG. 2
FIG. 2A
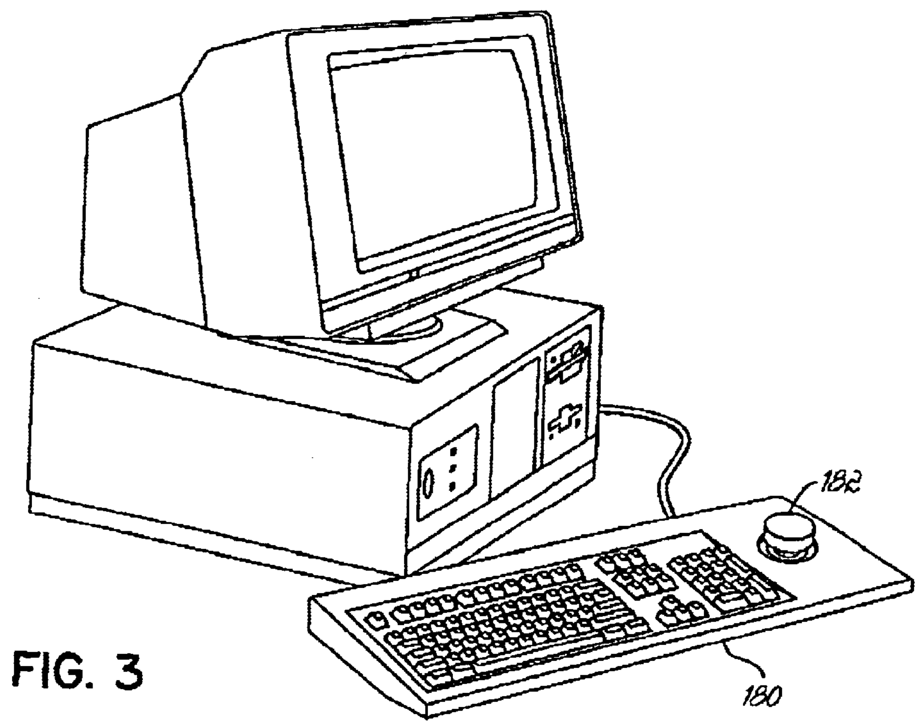
FIG. 3

ARRANGEMENT FOR THE DETECTION OF RELATIVE MOVEMENTS OR RELATIVE POSITIONS OF TWO OBJECTS

BACKGROUND OF THE INVENTION

Optoelectronic arrangement for the detection of relative movements or relative positions of two objects, which comprises at least three light emitting means as optoelectronic components. In addition, the invention relates to a force and/or moment sensor which utilises such an arrangement. Finally, the invention relates to a PC keyboard which comprises the inventive force and/or moment sensor.

1. State of the Art

As arrangements for the detection of relative movements or relative positions of two objects in force and/or moment sensors, arrangements with optoelectronic measuring cells have widely been accepted. The reason is the simple construction together with high precision and reliability.

DE 36 11 337 A1 discloses an optoelectronic arrangement accommodated in a plastic ball which can simultaneously detect six components, i.e. displacements along three axes and angular rotations about three axes. For this purpose, six light emitting means are arranged in a plane at essentially equal angular distances. In front of each light emitting means a stationary slit diaphragm is provided. The relative movements or relative positions are sensed by photosensitive detectors which are movably arranged relative to the arrangement of light emitting means and slit diaphragms, and whose detector axes extend essentially perpendicular to the direction of the slits. The arrangement requires relatively low construction efforts because the light emitting means and the diaphragms as well as any other electronic means for controlling and evaluating can be arranged on a single printed board by means of a conventional soldering technique, which can be securely connected with a first object. The position sensitive detectors are connected with the second object. It is, however, disadvantageous that the arrangement requires a relatively large area. This is caused by the relatively large spatial extent of the diaphragms and detectors which are arranged in an annular pattern around the light emitting means. This imposes a constraint on the miniaturisation of the arrangement.

Further documents which do not claim to be exhaustive and which show the technical background of the invention are:

DE27 27 704 C3; DE36 11 336 C2; DE32 40 251 A1; US3,921,445 U.S. Pat. No. 3,628,394.

DE 27 27 704 C3; DE 36 11 336 C2; DE 32 40 241 A1; U.S. Pat. No. 3,921,445; U.S. Pat. No. 3,628,394.

2. Problem on which the Invention is Based

Optoelectronic arrangements for measuring relative movements or relative positions as well as force and/or moment sensors which utilise such arrangements have gained increased importance in the past, primarily in industrial applications. Examples are the control of robots and the measurement of forces in automotive test and measuring benches. In general, commercially most interesting applications, however, are also offered for the arrangements and sensors in the office field and in the field of entertainment electronics. Here, they have the function of an input device by means of which up to six components can be input, in contrast to a joystick, a mouse, or a trackball which generally allow the input of only two components. A simple and convenient input of six components as it is provided for by a force and/or moment sensor with an optoelectronic arrangement is desirable for example in the control of 3D design software or sophisticated computer games. Due to their surface requirement, the present input devices are, however, definitely awkward to handle, which opposed any wider distribution. A miniaturisation would permit the installation e.g. into game consoles, PC keyboards, or notebook computers and thus enable a wide market penetration.

On the basis of the state of the art, the present invention is based on the object to create an arrangement for the detection of relative movements or relative positions of two objects, which compared to the known arrangements has a reduced surface requirement. The invention is further based on the object to create a force and/or moment sensor which compared to the known sensors also has a reduced surface requirement. The invention is finally based on the object to create an input device for the application in an office environment which permits an uncomplicated input of up to six force or torque components, respectively.

Inventive Solution

For the solution of this object, the invention teaches an optoelectronic arrangement for the detection of relative movements or relative positions of two objects, which comprises at least three light emitting means as optoelectronic components, and which is defined by the characteristics of claim 1. Furthermore, it teaches a force and/or moment sensor which is defined by the characteristics of claim 15. Finally, it teaches a personal computer keyboard which is defined by the characteristics of claim 21.

Construction and Development of the Inventive Solution

In an embodiment of the invention the light emitting means, preferably infrared light emitting diodes (ILED) are arranged on a closed, imaginary first surface which is plane or convex at each site, that their respective emission directions extend into a first inner space which is defined by the first surface.

As further optoelectronic elements the preferred embodiment comprises position sensitive detectors, preferably position sensitive infrared detectors. Moreover, each position sensitive detector is illuminated by a light emitting means in order to form a measuring cell.

Furthermore, in a possible development of the invention all light emitting means and position sensitive detectors are arranged in a common first plane. In another possible development the arrangement comprises at least four optoelectronic elements which are arranged on at least one first plane and one second plane in such a manner that at least three optoelectronic elements are arranged on the first plane and at least one optoelectronic element is arranged on only the second one of the two planes. Preferably, the first and the second plane are arranged parallel to each other.

In a development of the invention, a light emitting device illuminates exactly one position sensitive detector in order to form a measuring cell. In an alternative development of the invention, however, two position sensitive detectors are illuminated by a light emitting means in order to form two measuring cells with a common light emitting means. Thereby, preferably at each time only the one or the other of the two position sensitive detectors is read out so that the light emitting means always forms a measuring cell with only one each of the position sensitive detectors.

Due to the fact that in each moment a light emitting means is associated with only one position sensitive detector, the output signal of the position sensitive detectors can be used for controlling the currents of the respectively associated light emitting means in such a manner that each position sensitive detector is subjected to the same constant light quantity. This is advantageous in that all measuring cells are widely unaffected by temperature and aging influences as well as contamination and component tolerances. The output signals of the position sensitive infrared detectors (42, 62) are also transmitted to an analog/digital converter for further processing and from there to a microprocessor.

Besides the light emitting means, the position sensitive detectors are preferably also arranged on a closed imaginary second surface which is plane or convex in each site and in such a manner that their respective photosensitive sides face towards a second inner space which is defined by the second surface. The first and the second inner space preferably partially or even completely coincide so that a common inner space is generated about which the light emitting means and the position sensitive detectors are arranged. In a preferred embodiment of the invention, the light of a measuring cell from the light emitting means to the opposite position sensitive detector consequently always traverses the common inner space.

In order to be able to measure all six degrees of freedom by means of the optoelectronic arrangement, i.e. displacements along three linearly independent axes and rotations about three linearly independent axes as well, a preferred embodiment of the arrangement comprises six position sensitive detectors.

In a development of the invention the position sensitive detectors are preferably arranged in pairs of neighbouring position sensitive detectors, with the pairs comprising one position sensitive detector each for detecting a movement essentially perpendicular to the first plane and a position sensitive detector for detecting a movement essentially horizontally to the first plane. The detectors of one pair can be arranged next to one another if all detectors are located in one plane. If the detectors are distributed on two or more planes, the pairs can also be arranged one above the other.

Moreover, the pairs of position sensitive detectors are oriented at an essentially identical angular distance relative to each other so as to be rotated about an axis which extends essentially perpendicular to the first plane. If the arrangement comprises three pairs of position sensitive detectors, the second and the third detector are rotated with respect to the orientation of the first position sensitive detector by essentially one third or two thirds, respectively, of a full revolution.

In a particularly compact and thus particularly preferred construction, light emitting means which have a small lateral extent are arranged between two pairs each of position sensitive detectors. Preferably, the pairs of light emitting means are oriented at an essentially equal angular distance so as to be rotated about an axis relative to each other, which extends essentially perpendicular to the first plane.

In a preferred embodiment the optoelectronic arrangement for the detection of relative movements or relative positions also comprises one each slit diaphragm which is arranged in the beam path of the light emitting means between the light emitting means and the position sensitive detector, so that only a narrow light bar impinges on the downstream position sensitive detector. The direction of the slit of the slit diaphragm is oriented essentially perpendicular to the detector axis of the position sensitive detector.

In order to be able to measure relative movements or relative positions one component each of the system light emitting means, slit diaphragm, detector must be movable relative to the other two elements. In the preferred embodiment the light emitting means and the position sensitive detectors are mounted stationary on a printed board, while the slit diaphragms are movable relative to them. This is advantageous in that all electronic components can be accommodated on a single printed board.

In a particularly preferred embodiment, the light emitting means and position sensitive detectors are provided at the side of a cylindrical printed board, which faces inwards.

A cylindrical printed board is a printed board whose surface is defined by a surface of a cylinder or by a part of a surface of a cylinder. The surface of a cylinder is generated by parallel shift of a straight line along a curve.

Among other things, the printed board shields the optoelectronic detectors against external stray light.

The inventive force and/or moment sensor comprises a first and a second board, with the first and the second board being elastically connected with each other and being movable relative to each other. It also comprises the inventive arrangement for detecting the movements of the first and the second board relative to each other. The boards are preferably printed boards, with the first board carrying all electronic components, in particular the light emitting means and the position sensitive detectors, as well as control electronics for controlling the currents of the light emitting means, amplifiers, if required, and a digital portion for data conversion, and/or other means. By arranging all electronic components on only one printed board, the assembly expenditure during the manufacture is significantly reduced.

The two boards are connected by at least one spring and/or damping means, preferably from one of the following components or combinations thereof: helical spring, spring assembly, elastomer, cast resin. These spring and/or damping means take up the forces and torques. If their elastic properties are known, the forces and torques acting relative to each other can be measured from the relative positions of the two boards.

The two boards are preferably elastically connected with each other by means of three spring and/or damping means. The spring and/or damping means are preferably arranged in a rotation symmetrical manner around a centre, around which the measuring cells, too, are arranged. This is advantageous in that invariably symmetrical forces are acting in the force and/or moment sensor. It is particularly preferred that exactly three spring or damping means are arranged each rotated by one third of a full revolution relative to one another.

In a preferred embodiment at least one of the spring and/or damping means comprises at least one elastomer element which at its two opposite ends is securely connected with the first or the second board, respectively. In this manner, the elastomer elements can be loaded in all directions, i.e. tension and compression forces as well as forces acting transversely to the elastomer element can be applied without the elastomer elements moving in their seats or even coming out of them.

A preferred embodiment of the force and/or moment sensor further comprises at least one stop means which limits the relative movement of the two boards towards each other. This is preferably realised by stop bolts which are firmly connected with one board. In this manner, the force and/or moment sensor is protected against overload.

From the inventive configuration of the arrangement for detecting the relative movements or relative positions of two objects the following advantageous properties result:

1. Most compact design with low construction expenditure;

2. high linearity, low hysteresis, and a large degree of freedom from wear by the application of optoelectronic measuring cells.

From the inventive configuration of the force and/or moment sensor the following advantageous property results in addition to the above mentioned ones:

3. Low susceptibility to damage by the application of stop means.

From the inventive configuration of the PC keyboard the following advantageous property results in addition to the above mentioned ones:

4. The novel personal computer keyboard permits the uncomplicated input of up to six components at the personal computer workplace.

Further characteristics, properties, advantages, and possible modifications will become apparent for those with skill in the art from the following description of a preferred embodiment in which reference is made to the accompanying drawing.

SHORT DESCRIPTION OF THE DRAWINGS

FIG. 2 depicts the force and/or moment sensor of FIG. 1, including a second board, FIG. 2A is a partial cross-sectional view, taken along line 2A—2A in FIG. 2.

FIG. 3 depicts an embodiment wherein a computer keyboard includes a force and/or moment sensor according to the invention.

DETAILED DESCRIPTION OF AN EMBODIMENT

Figure 1:
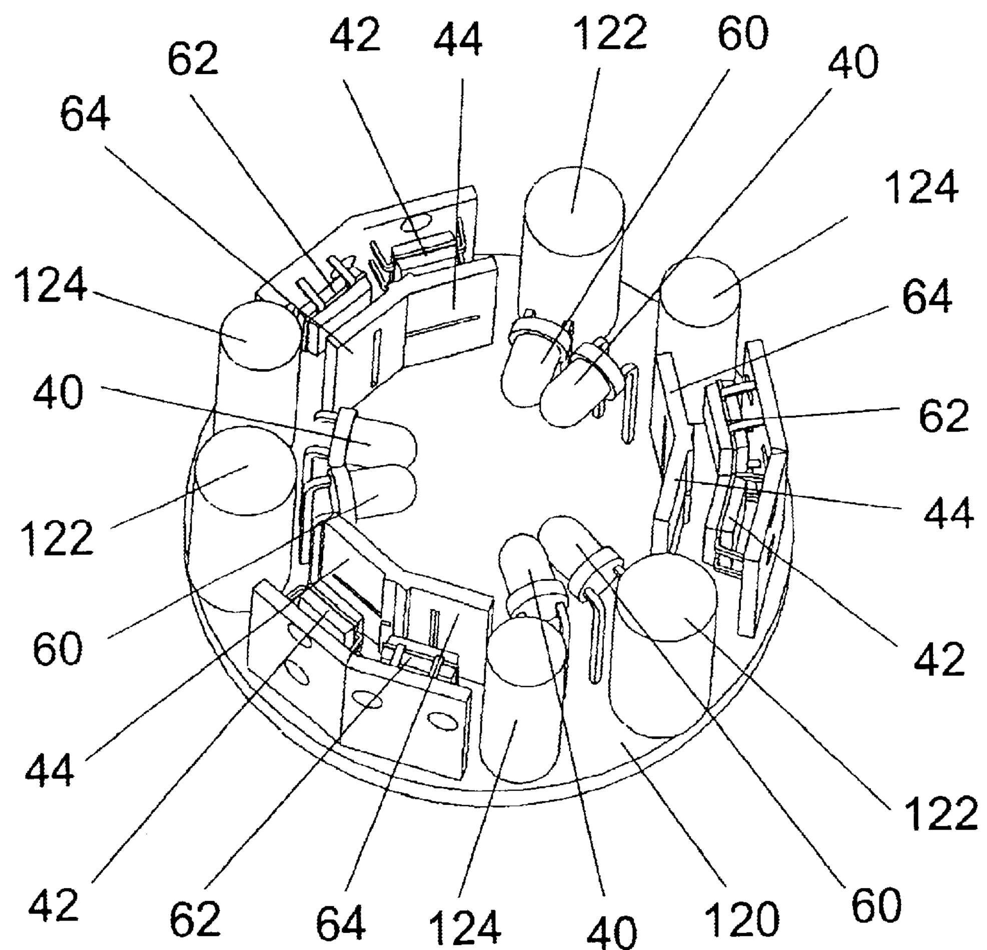
FIG. 1 shows a preferred embodiment of the inventive force and/or moment sensor with the inventive optoelectronic arrangement for the detection of relative movements or relative positions of two objects in a perspective view.

The optoelectronic arrangement for the detection of relative movements or relative positions of two objects as shown in FIG. 1 comprises six ILED's 40, 60 which are mounted on the first board 120 and arranged on a circumference. If one imagines this circumference as the circumference of a spherical surface, this spherical surface will be a closed imaginary first surface which is convex at each site, on whose inside the six ILED's 40, 60 are arranged in such a manner that their respective emission directions extend towards a first inner space which is defined by the first surface. In other words, all ILED's 40, 60 shine from the inside of the imaginary spherical surface into the interior of the sphere.

Moreover, six position sensitive infrared detectors as further optoelectronic elements 42, 62 are arranged on the first board 120. Thereby, one ILED 40, 40 illuminates exactly one position sensitive infrared detector 42, 62 in order to form a measuring cell. All light emitting means and position sensitive detectors are arranged in a common first plane which extends parallel to the first board 120, and the light beam from ILED to detector extends in the same plane in which the optoelectronic elements of the respective measuring cell are arranged.

Like the ILED's 40, 60 the position sensitive infrared detectors 42, 62 are mounted on the board 120 and arranged on a second circumference. If one imagines this second circumference also as the circumference of a spherical surface, this spherical surface will be a closed imaginary second surface which is convex at each site, on whose inside the six position sensitive infrared detectors 42, 62 are arranged in such a manner that their respective photosensitive sides face towards a first inner space which is defined by the second surface. The first inner space lies completely within the second inner space and thus a common inner space is generated which coincides with the first inner space. The light emitting means 40, 60 and the position sensitive detectors 42, 62 are thus arranged around the common inner space. The ILED 40, 60 and the associated position sensitive infrared detector 42, 62 of a measuring cell are arranged opposite each other and the light traverses the common inner space.

The optoelectronic arrangement of the preferred embodiment which is introduced here can measure relative movements or relative positions of two objects in six degrees of freedom, namely displacements in three linearly independent spatial directions and rotations also about three linearly independent spatial directions. For this purpose, six position sensitive infrared detectors 42, 62 are provided which together with the six ILED's 40,60 form six measuring cells.

Moreover, the position sensitive infrared detectors 42, 62 are arranged in pairs of position sensitive infrared detectors 42, 62, with the pairs comprising one position sensitive detector 42 each for detecting a movement perpendicular to the first plane and a position sensitive detector 62 for detecting a movement in the first plane. In addition, the pairs of position sensitive infrared detectors 42, 62 are rotated relative to each other by one third of a full revolution about the axis which extends perpendicular to the first plane. Pairs of neighbouring ILED's 40, 60 each are arranged between pairs of position sensitive infrared detectors 42, 62. The pairs of ILED's 40, 60, too, are oriented at an equal angular distance so as to be rotated relative to each other about an axis which extends vertically to the first plane.

At each measuring cell a slit diaphragm 44, 64 is arranged in the beam path of the ILED in front of the position sensitive infrared detector. They comprise a narrow slit so that only a narrow light strip impinges on the position sensitive detector 42, 62. The direction of the slit of the slit diaphragm is perpendicular to the detector axis, i.e. in the measuring direction of the detector. Due to the fact that one element of the system light emitting means 40, 60 slit diaphragm 44, 64, and position sensitive infrared detector 42, 62 is arranged so as to be movable relative to the other elements the measuring cell can detect relative movements and relative positions.

In the preferred embodiment introduced herein, the slit diaphragm 44, 64 is movable relative to the position sensitive detector 42, 62 and the light emitting means 40, 60. The position sensitive detectors 42, 62 and the ILED's 40, 60 are securely arranged on the cylindrical printed board 80. The slit diaphragms 44, 64 which are assigned a pair of neighbouring detectors are combined to a single slit diaphragm 44, 64 with two slits extending perpendicular to one another.

The force and/or moment sensor which is also shown in FIG. 1 consists of a first board 120 and a second board 140 which are elastically connected with each other and are movable relative to one another. It is provided with an inventive arrangement for the detection of relative movements or relative positions between the first board 120 and the second board 140. The first board 120 is preferably a printed board to which the printed board 80 which carries the ILED's 40, 60 and the position sensitive infrared detectors 42, 62 is firmly soldered. The first board 120 carries further electronic components. The silt diaphragms 44, 64 are firmly connected with the second board 140.

Elastomer cylinders 122 act as spring and damping means which connect the first board 120 and the second board elastically with each other. The elastomer cylinders 122 are connected to the first board 120 with their one end and to the second board 140 with their other end. Three elastomer cylinders are provided which are arranged rotation symmetrically, near the outside of the board 120 near the infrared light emitting diodes 60.

In order to limit the relative movements or relative positions of the two boards 120, 140 so that any overload cannot result in damage occurring to the force and/or moment sensor, three stop means 124 in the form of the stop bolts are provided. The stop bolts are securely connected with the second board 140 and project through holes in the first board 120. The horizontal movement of the first board 120 relative to the second board is determined by the diameter of the stop means 124 and the diameters of the holes in the first board 120. The movement of the two boards 120, 140 relative to one another is limited by enlargements 125 at the bolt-shaped stop means 124. The distance of the enlargements 125 from the first board 120 towards the bolts 124 determines the range within which the first board 120 and the second board are movable relative to one another in the vertical direction.

In one embodiment, a personal computer keyboard 160 includes a force and/or moment sensor 182 as described above.

What is claimed is:

1. An optoelectronic system for the detection of relative movement or relative positions of two objects, the system comprising:

at least three light emitting devices angularly distributed about a center region and facing inwardly toward said center region; and at least six position-sensitive detectors distributed about said center region at angular offsets from said light emitting devices, each detector being disposed for illumination by a light beam traveling from one of said light emitting devices across said center region to the respective detector, said detectors being arranged in pairs angularly spaced from each other at regular intervals, said detectors in each pair detecting movement in mutually perpendicular directions.

2. The optoelectronic system of claim 1, comprising at least six light emitting devices, each light emitting device being disposed for illuminating a respective one of said detectors.

3. The optoelectronic system of claim 2, wherein said light emitting devices are arranged in pairs angularly spaced from each together at regular intervals, said pairs of detectors and said pairs of fight emitting devices being angularly arranged in alternation about said center region.

4. The optoelectronic system of claim 1, wherein each light emitting device is disposed for illuminating two respective ones of said detectors.

5. The optoelectronic system of claim 1, wherein said light emitting devices are arranged in single common plane and said detectors are arranged in the same plane.

6. The optoelectronic system of claim 1, comprising at least four light emitting devices, at least three of said light emitting devices being arranged in a first plane and at least one other of said light emitting devices being arranged in a second plane parallel to said first plains.

7. The optoelectronic system of claim 1, wherein said light emitting devices are arranged at a first radius and said detectors are arranged at a second radius greater than said first radius.

8. An optoelectronic system for detecting relative movement or relative positions of two objects, the system comprising:

at least three light emitting devices angularly distributed about a center region;

a plurality of position-sensitive detectors, each of said detectors being arranged to be illuminated by light from one of said light omitting devices;

a plurality of slit diaphragms, each slit diaphragm arranged in a light beam path between one of said detectors and a corresponding light emitting device, a slit direction of each slit diaphragm being aligned perpendicularly to a detection axis of the corresponding detector, wherein said slit diaphragms are moveable relative to said light emitting devices and said detectors.

9. The optoelectronic system of claim 8, comprising at best six position-sensitive detectors, said detectors being arranged in pairs angularly spaced from each other at regular intervals said detection axes of said detectors in each pair being substantially perpendicular to each other.

10. The optoelectronic system of claim 8, further comprising a first board and a second board resiliently connected to said first board so as to be moveable relative thereto, said light emitting devices and said detectors being mounted to said first board and said slit diaphragms being mounted to said second board.

11. The optoelectronic system of claim 10, wherein said first board comprises a printed circuit board.

12. The optoelectronic system of claim 10, wherein said first and second boards are connected to each other through at least one spring and/or damping means.

13. The optoelectronic system of claim 12, wherein said spring and/or damping means includes one or more of the following: a helical spring, a spring assembly, an elastomeric body, a cast resin.

14. The opteoelectronic system of claim 12, comprising a plurality of said spring and/or damping means that are regularly distributed about said center region.

15. The optoelectronic system of claim 12, wherein said spring and/or damping means includes at least one of an elastomeric body and a spring member that is firmly connected to said first and second boards.

16. The optoelectronic system of claim 10, further comprising at least one stop member for limiting relative movement of said first and second boards.

17. A force or torque sensor, comprising:

at least three light emitting devices angularly distributed about a center region and facing inwardly toward said center region; and at least six position-sensitive detectors distributed about said center region at angular offsets from said light emitting devices, each detector being disposed for illumination by a light beam traveling from one of said light emitting devices across said center region to the respective detector said detectors being arranged in pairs angularly spaced from each other at regular intervals, said detectors in each pair detecting movement in mutually perpendicular directions.

18. The force or torque sensor of claim 17, further comprising a plurality of slit diaphragms, each slit diaphragm arranged in a light beam path between one of said detectors and one of said light emitting devices.

19. A personal computer keyboard, comprising:

a force or torque sensor, comprising:

at least three light emitting devices angularly distributed about a center region and facing inwardly toward said center region; and at least six position-sensitive detectors distributed about said center region at angular offsets from said light emitting devices, each detector being disposed for illumination by a light beam traveling from one of said light emitting devices across said center region to the respective detector, said detectors being arranged in pairs angularly spaced from each other at regular intervals, said detectors in each pair detecting movement in mutually perpendicular directions.

* * * * *